United States Patent
Goeler et al.

[11] Patent Number: 6,035,932
[45] Date of Patent: Mar. 14, 2000

[54] PROCESS AND APPARATUS FOR HEATING A GAS DELIVERED TO A MEMBRANE GAS SEPARATOR

[75] Inventors: Patrice Goeler, Maisons-Alfort; Lionel Barry, Charenton-Le-Pont, both of France

[73] Assignee: L'Air Liquide, Societe Anonyme pour l'Etude et l'Exploitation des Procedes Georges Claude, Paris, France

[21] Appl. No.: 08/688,755

[22] Filed: Jul. 31, 1996

[30] Foreign Application Priority Data

Jul. 31, 1995 [FR] France ................................. 95 09321

[51] Int. Cl.⁷ ............................. B01D 53/22; F28F 27/02
[52] U.S. Cl. ........................... 165/297; 165/299; 165/50; 165/47; 165/103; 165/218; 237/59
[58] Field of Search ............................. 165/50, 218, 103, 165/297, 130, 55, 47, 299; 237/59

[56] References Cited

U.S. PATENT DOCUMENTS

| | | | |
|---|---|---|---|
| 1,342,680 | 6/1920 | Jeannotte | 165/130 |
| 1,807,202 | 5/1931 | Duilnsky | 165/130 |
| 1,862,219 | 6/1932 | Harrison | 165/130 |
| 2,247,972 | 7/1941 | Sullivan | 237/59 |
| 2,492,757 | 12/1949 | Meek | 165/50 |
| 2,877,000 | 3/1959 | Person | 165/130 |
| 3,391,731 | 7/1968 | Dziekonski | 165/55 |
| 3,425,485 | 2/1969 | Newton | 165/218 |
| 3,472,313 | 10/1969 | Milgram et al. | 165/218 |
| 3,516,483 | 6/1970 | Benteler et al. | 165/55 |
| 3,593,780 | 7/1971 | Donnelly | 165/50 |
| 3,610,523 | 10/1971 | Troy | 237/59 |
| 4,449,569 | 5/1984 | Lisi et al. | 165/297 |
| 5,443,112 | 8/1995 | Scheideman | 165/297 |

FOREIGN PATENT DOCUMENTS

| | | | |
|---|---|---|---|
| 483696 | 6/1932 | Canada | 237/59 |
| 0128808 | 12/1984 | European Pat. Off. | |
| 0 362 436 | 4/1990 | European Pat. Off. | |
| 0 517 570 | 12/1992 | European Pat. Off. | |
| 0 659 464 | 6/1995 | European Pat. Off. | |
| 2279036 | 2/1976 | France | 237/59 |
| 2 571 270 | 4/1986 | France | |
| 3736107 | 5/1989 | Germany | 165/103 |
| 174877 | 4/1961 | Sweden | 237/59 |
| 1028437 | 10/1964 | United Kingdom | 237/59 |
| 1052095 | 12/1966 | United Kingdom | 237/59 |
| 1175099 | 12/1969 | United Kingdom | 237/59 |
| 2166540 | 5/1986 | United Kingdom | 165/103 |
| 2245967 | 1/1992 | United Kingdom | 165/50 |
| WO 92/13628 | 8/1992 | WIPO | |

Primary Examiner—John K. Ford
Attorney, Agent, or Firm—Young & Thompson

[57] ABSTRACT

A process and apparatus for heating gas in which a flow rate $D0$ of a warm fluid is caused in an input line, connected at its upstream portion to a source of warm fluid and at its downstream portion to the inlet of one of the passages of a heat exchanger; a portion of the flow $D0$ is diverted before it reaches the inlet of the first passage, into a branch line connected at its upstream portion to a so-called primary point of the inlet line located between the source of warm fluid and the inlet of the first passage; the gas to be heated is caused to circulate in another passage of the exchanger, so as to effect heat exchange between the gas to be heated and the warm fluid, thereby to obtain at the outlet of the second passage a warmed gas, and at the outlet of the first passage, a cooled warm fluid; the temperature of the warmed gas is controlled by the aid of a flow rate regulating valve located in a selected position in the inlet or outlet line.

9 Claims, 2 Drawing Sheets

PROCESS AND APPARATUS FOR HEATING A GAS DELIVERED TO A MEMBRANE GAS SEPARATOR

The present invention relates to the field of processes for heating a gas by heat exchange in a heat exchanger with a warm fluid.

It is particularly applicable to the case of heating a gas before its separation by membrane technique, and more particularly to the case of heating a flow of air before its membrane separation so as to obtain at the residue (or reject) outlet of the membrane separator a gaseous mixture enriched in nitrogen.

Recalling now that the principle of gas separation by membrane technique is that, under the influence of a partial pressure differential on opposite sides of the membrane, there is obtained on the permeate or outlet side a mixture at low pressure, enriched in the most permeable components, and at the residue outlet of the membrane (also called the "residue side" or "reject side"), a mixture at a pressure near the supply pressure (of the entering mixture) and which is enriched in the least permeable components.

By way of illustration, there will thus be used to produce nitrogen from air, semi-permeable membranes having good properties for the separation of oxygen from nitrogen (selectivity), for example of the polyimide type, the mixture rich in nitrogen being obtained at the residue outlet of the membrane separator.

There could also be cited the example of the production of hydrogen or CO, by membrane technique, in the course of which most often there is a recovery from mixtures output by certain industries, that are separated on semi-permeable membranes having good properties for the separation of hydrogen from other components of the mixture, for example of the polyaramide type, the mixture enriched in hydrogen being then obtained at the permeate outlet of the membrane separator, the mixture enriched as the case may be in hydrocarbons or in CO being obtained at the residue outlet of the membrane separator.

It will thus be apparent that the separation efficiencies obtained will depend very greatly on the conditions of use of the membrane, particularly the temperature, the supply pressure to the membrane, or again the content of the field mixture in the component which it is desired to extract on the permeate side or the residue side.

It is thus known, as to the temperature, that most often, increasing the temperature of operation of the membrane (hence the temperature of the entering mixture which passes through it), the permeability and hence the productivity of the membrane increase.

Thus, and according to the level of efficiency sought, there is most often a step of heating the gaseous mixture to be separated, before its arrival at the membrane separator.

This heating step is most often provided with the aid of an electric heater, operated by a square wave electric pulse generator, as a function of measurement of the temperature of the gas to be heated. This electric heating method of the gas is very costly, because it consumes a great deal of energy, contributing for example in a significant way to the cost of the nitrogen produced by membrane technique.

It has also been proposed to recover the heat of the oil used as cooling fluid for the gas compressor present in such installations for the separation of gas by membrane technique. This heat recovery however is quite delicate because it must take place without disturbing the cooling circuit of the compressor, whilst being compatible with obtaining good regulation of the temperature of the heated gas.

There could also be cited the document EP-A-362 436, which envisages the use of a portion of the compressor oil to heat in a heat exchanger air compressed before its separation in a membrane module. The control of temperature of the air thus heated is obtained by use of a bypass line for a portion of the flow rate of the oil arriving at the exchanger, in which line is present an adjustment valve permitting the control of the quantity of oil circulating in the bypass line. This arrangement inevitably is risky in case malfunction or breakdown of the regulator valve takes place, the whole of the oil flow then reaching the exchanger and hence impairing the heating operation, giving rise to possible overheating of the air treated in the membrane separator.

In this context, the object of the present invention is to provide an approved process for heating a gas by passage through an exchanger in which a warm fluid circulates, permitting obtaining:

- a significant reduction of the cost of the heating operation relative to conventional processes for electrical heating;
- a good regulation of the temperature of the heated gas, offering assurance of reliability and safety.

The process of heating a gas by passage through an exchanger according to the invention comprises taking the following steps:

- a flow $D0$ of a warm fluid is passed through a so-called inlet line, connected at its upstream portion to a source of the warm fluid and at its downstream portion to the inlet of a first passage (which can be considered a warm passage), of an exchanger;
- a portion of the flow $D0$ is removed before it reaches the inlet of the warm passage of the exchanger, through a branch line connected to a so-called primary point of the inlet line, located between the source of warm fluid and the inlet of the warm passage;
- the gas to be heated is passed through a second passage of the exchanger (which can be considered a cold passage) so as to provide in the exchanger heat exchange between the gas to be heated and the warm fluid, so as to obtain at the outlet of the cold passage a warmed gas, and at the outlet of the warm passage, a cooled warm fluid;
- the cooled warm fluid is caused to leave the warm passage of the exchanger by a so-called outlet line, which is configured according to one of the following configurations:
   (i) the outlet line connects the outlet of the warm passage of the exchanger to the source of warm fluid, the branch line then connecting the primary point of the inlet line to a so-called secondary point of the outlet line;
   (ii) the branch line connects the primary point of the inlet line to the source of warm fluid, the outlet line being then connected at its downstream portion to a so-called secondary point of the branch line;
- a pressure drop is established in the branch line between the primary point and the secondary point;
- the temperature of the warmed gas obtained at the outlet of the cold passage of the exchanger is adjusted by means of a flow regulation valve located in one of the two following positions: in the inlet line, between the primary point and the inlet of the warm passage; or else in the outlet line, between the outlet of the warm passage of the exchanger and the secondary point.

The process according to the invention uses the combination of the following steps:

the positioning of a controlled pressure drop in a selected portion of the system, so as to permit directing toward the warm passage of the exchanger only a relatively small portion of the flow D0 and thus avoiding disturbing the normal operation of the source of warm fluid from which is provisionally withdrawn a certain quantity of fluid. In practice, it will be seen that most often, the circulation in the warm passage of the exchanger of only several percent (for example less than 5%) of the flow D0 will give satisfactory results;

regulation of the temperature of the warmed gas obtained at the outlet of the cold passage of the exchanger, by the use of a flow regulation valve disposed in a predetermined way, in the inlet line between the primary point and the inlet of the warm passage of the exchanger (regulation of the entering flow), or else in the outlet line between the outlet of the warm passage of the exchanger and the secondary point (regulation of the outlet flow).

The pressure drop introduced must therefore be determined in each case, so as to be on the one hand sufficient that the portion of the flow D0 will effectively reach the exchanger and play its role in the desired heat exchange, but not so high that the operation of the source of warm fluid will be disturbed.

According to the case in question, the pressure drop in the branch line can be obtained by multiple methods. There will be cited by way of example here the following means:

the use of a branch line diameter less than that of the inlet line to the primary point to which the branch line is connected, the emplacement in the branch line, between the primary point and the secondary point, of a calibrated restriction, the emplacement in the branch line, again between the primary point and the secondary point, of a reducing valve, or else the simple emplacement at the primary connection point between the inlet line and the branch line of an elbow.

There could also be contemplated a combination of certain of these means.

Preferably, the pressure drop introduced will be within the range of 50 mbar to 3 bar, more preferably within the range 100 mbar to 1 bar, and most preferably less than or equal to 600 mbar.

As the regulation valve, there will preferably be used a smaller regulation valve with two passages, such as a thermostatic valve, an electrovalve with or without constant timed opening but with a duration of opening variable according to the result of the temperature measurement of the warmed gas obtained at the outlet of the cold passage of the exchanger, or else a progressively opening valve.

As will be apparent to one skilled in the art, the source of warm fluid could have numerous possibilities; there will be cited here, purely by way of illustration, the case of a source of warm fluid constituted by a gas compressor, the fluid being then constituted by the oil used for the cooling of the compressor (but also for its lubrication properties), or else as a second example, a source of warm fluid constituted by warm water.

It will be noted that when the warm fluid used is oil, and the selected regulation member is an electrovalve (which opens and closes with a very high annual frequency as the case may be), the fact that this electrovalve operates in the presence of oil (because located on the inlet or outlet line of the exchanger) improves considerably its reliability.

According to embodiments of the invention, the heated gas obtained at the outlet of the cold passage of the exchanger is ultimately directed toward a gas separator by membrane technique where it undergoes a separation operation. The gas to be heated could thus be for example constituted by air to produce by membrane technique a gaseous mixture based on nitrogen containing a residual concentration of oxygen, or else could be constituted by a gaseous mixture from certain industries, for example rich in hydrogen and CO, to obtain by membrane technique a gaseous mixture rich in CO at the residue outlet of the separator and a mixture rich in hydrogen at the permeate outlet of this same separator.

The emplacement of a controlled pressure drop in the branch line ensures continuous circulation of the major portion of the flow D0 of warm fluid toward the source (for example of oil in the compressor) and therefore offers because of this an excellent safety of operation.

By way of comparison, the use in the branch line of a regulating valve (according to the document set forth above) could, in case of accident, close the branch line, which would lead to running through the exchanger all of the flow D0 of warm fluid with all the risk of overheating set forth above.

On the contrary, in the case of the present invention, even if an accident of operation takes place in the regulation valve, the configuration adopted ensures perfect safety:

if the latter remains abnormally totally open, the emplacement of the controlled pressure drop in the branch line ensures that in any case only a small portion of the flow of warm fluid circulates in the exchanger (eliminating the risk of overheating);

if the latter remains abnormally totally closed, all the flow then circulates in the branch line, which ensures the fact that the operation of the source of warm fluid is not disturbed.

The concepts used according to the invention of "primary point" and "secondary point" corresponding respectively to an intersection of an input line and a branch line, and of a branch line and an outlet line, there will be alternatively used the "primary point of the inlet line", the "primary point of the branch line", the "secondary point of the branch line", the "secondary point of the outlet line".

The invention also relates to an apparatus for warming a gas characterized particularly by the use of the process described above, comprising:

a source of warm fluid;

a transport line for fluid, called an input line, connecting a source of warm fluid to the inlet of a first passage (which can be considered a warm passage) of an exchanger;

a fluid transfer line, a so-called outlet line, connected at its upstream portion to the outlet of the warm passage of the exchanger;

a source of gas to be heated;

a cold line connecting the source of gas to be heated to the inlet of a second passage of the exchanger (which can be considered a cold passage);

characterized in that it comprises:

a transport line for so-called branch fluid, connected at its upstream portion to a so-called primary point of the inlet line, located between the source of warm fluid in the inlet of the warm passage of the exchanger, and in its downstream portion according to one of the two following configurations:

(i) the outlet line connects the outlet of the warm passage of the exchanger to the source of warm fluid, the branch line connecting then the primary point to a so-called secondary point of the outlet line;

(ii) the branch line connects the primary point to the source of warm fluid, the outlet line then being connected at its downstream portion to a so-called secondary point of the branch line;

means for creation of a pressure drop in the branch line between the primary point and the second point;

a flow regulation valve located in one of the two following positions: in the input line, between the primary point and the inlet of the warm passage of the exchanger, or else in the output line, between the outlet of the warm passage of the exchanger and the secondary point.

Other characteristics and advantages of the present invention will become apparent from the following description of embodiments given by way of illustration but in no way limiting, with respect to the accompanying drawings, in which.

Figure 1:
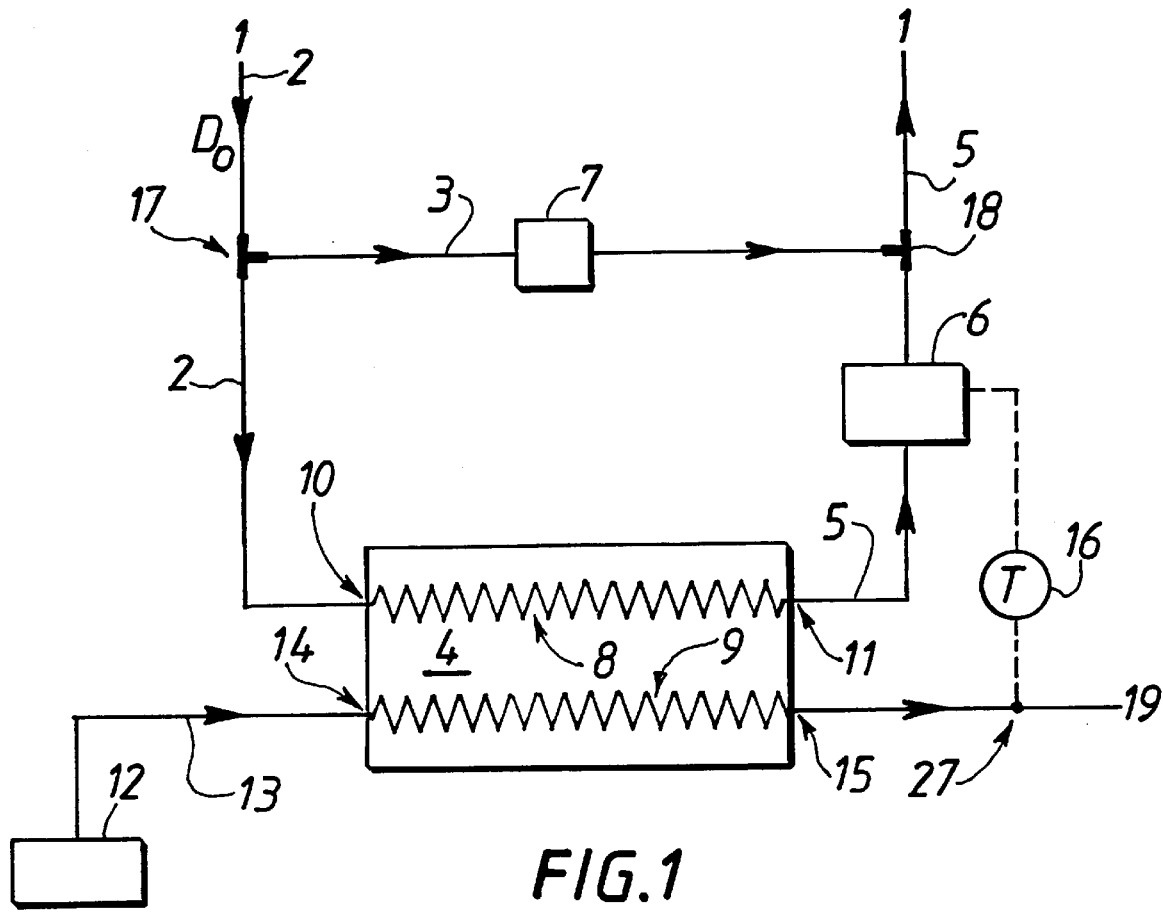
FIG. 1 is a schematic view of an apparatus for the practice of the process according to the invention.

FIG. 1 shows one of the embodiments of the invention in which a flow D0 of warm fluid from a source of warm fluid 1 (for example oil or else warm water) is directed along a fluid inlet line 2 toward one of the passages (warm passage 8) of an exchanger 4.

The inlet of the warm passage and the outlet of the warm passage are indicated by reference numerals 10 and 11, respectively.

There is branched into a branch line 3, a portion of the flow D0 of warm fluid before it reaches inlet 10 of the warm passage of the exchanger.

In parallel, there circulates in a second passage (cold passage 9) of the exchanger, gas to be reheated from a source 12 of gas to be reheated via the cold gas line 13. There is shown at 14 and 15, respectively, the inlet of the cold passage of the exchanger and the outlet of the cold passage of the exchanger. After circulation in the exchanger and heat exchange, the reheated gas obtained at the outlet 15 of the cold passage is directed toward a user station 19 of such a reheated gas.

The cooled warm fluid obtained at the outlet 11 of the warm passage of the exchanger is as to itself directed, via an outlet line 5, toward the source of warm fluid 1.

It will be noted that the branch line 3, connected between the primary point 17 of the inlet line 2 and the secondary point 18 of the outlet line 5, reinjects the warm fluid removed at point 17 into the line 5 which connects to the source of warm fluid.

In the illustrated embodiment, there is shown by reference numeral 7, a means for creating a pressure drop (for example a calibrated restriction) inserted in the branch line between the primary point 17 and the secondary point 18, and the provision at point 18 of an elbow between the lines 3 and 5.

As broadly indicated above, other embodiments could be envisaged of the means for causing pressure drop in the line 3, such as for example the simple use of an elbow at point 17 (without use of means 7) or else the use at the connection point 17 of a diameter of line 3 which is less than the diameter of line 2.

This embodiment moreover shows, in combination with this means 7 for creating a pressure drop, a regulation valve symbolized by reference numeral 6, located in the outlet line 5 between the outlet 11 and the secondary point 18, permitting adjusting the temperature of the reheated gas obtained at the outlet 15 of the cold passage of the exchanger 4 thanks particularly to a temperature measurement (16) of this reheated gas effected at the point shown at 27 in the figure. For reasons of simplicity, there has not been shown in this feature the regulatory block associated with such an operation (for example of the PID type).

Figure 2:
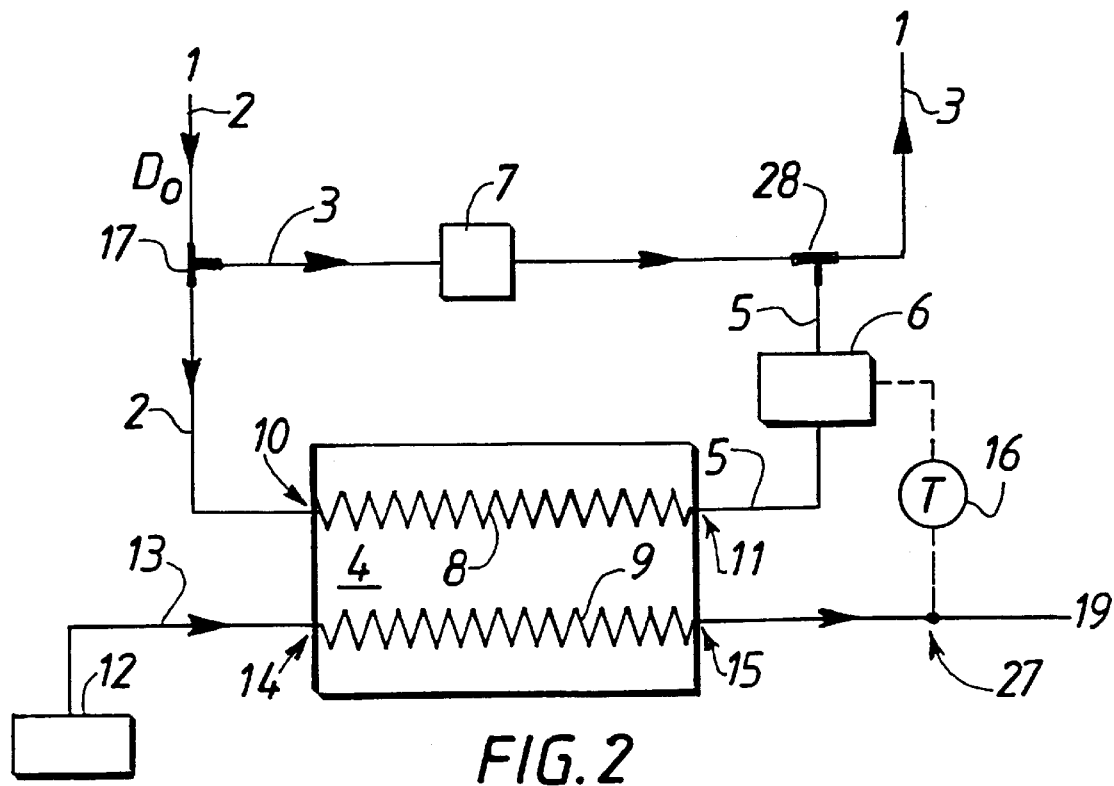
FIG. 2 is a schematic view of another apparatus for the practice of the process according to the invention.

FIG. 2 shows a modification of the embodiment shown in FIG. 1, wherein this time the branch line 3 is connected at its upstream portion to the primary point 17 of the inlet line and at its downstream portion to the source 1 of warm fluid. The outlet line 5 then connects at its upstream portion the outlet 11 of the warm passage of the exchanger to a secondary point 28 located in the branch line 3 between the primary point 17 and the source 1 of warm fluid. It will be noted that such an arrangement at the secondary point 28 creates a Venturi effect (connected to the geometry of the secondary point and to the fact that the flow of cooled warm fluid arriving at the secondary point is in general much lower than that which flows in the branch line upstream of the secondary point).

The two embodiments shown in FIGS. 1 and 2 use a regulatory valve located in the outlet line between the outlet of the warm passage of the exchanger and the secondary point (18 or 28). As indicated above, one could also preferably have used a regulatory valve located in the inlet line 2, between the primary point 17 and the inlet 10 of the warm passage 8 (regulation of flow entering the exchanger).

Figure 3:
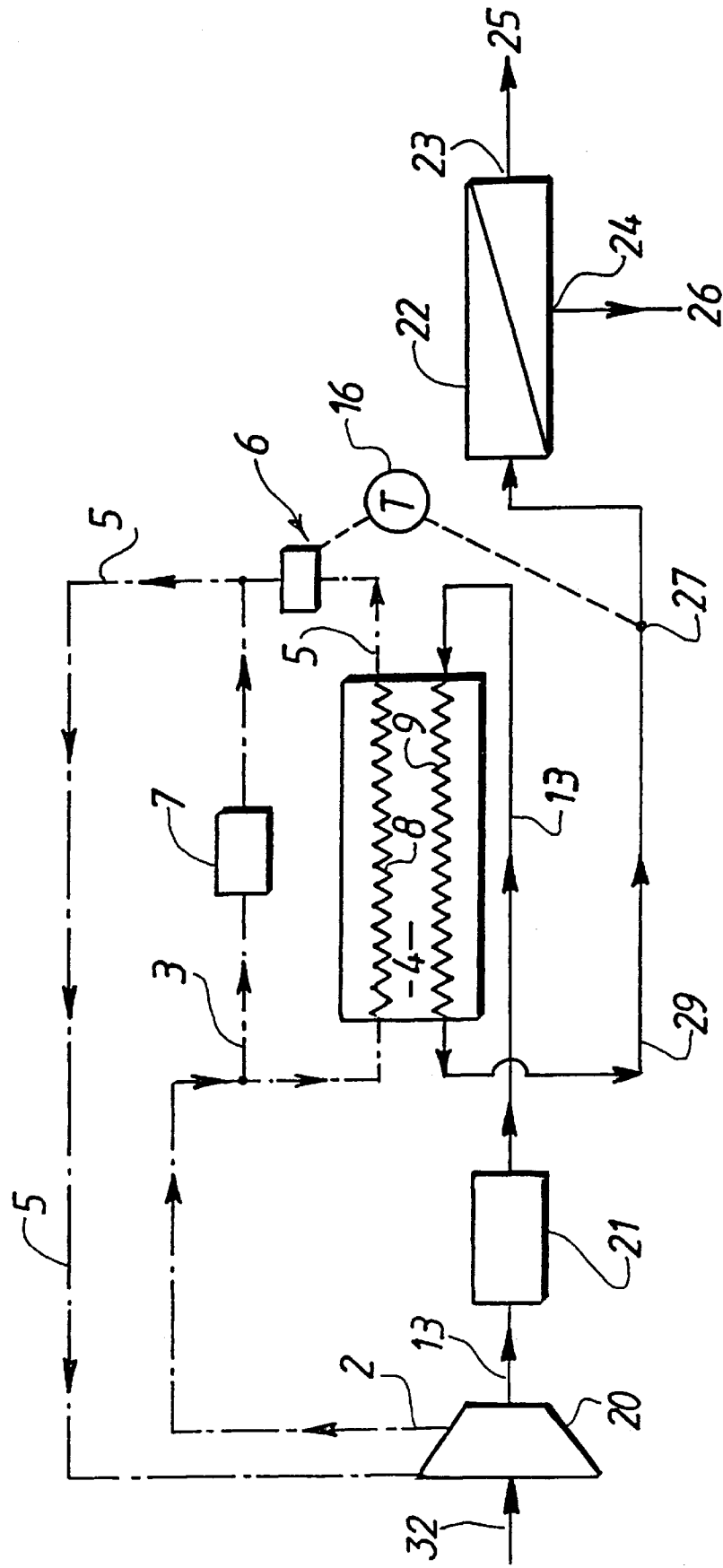
FIG. 3 is a schematic view of an installation for the production of impure nitrogen by membrane separation from compressed air, including a warming apparatus (of the air before its arrival at the membrane separator) according to the invention.

FIG. 3 shows the case of an installation for the production of impure nitrogen by membrane technique, from compressed air, embodying a warming apparatus of the compressed air before its arrival at the membrane separator, such as that described in connection with FIG. 1.

The source 12 of gas to be heated is then in this instance constituted by an air compressor 20 with an inlet 32, which supplies the exchanger 4, along a cold line 13, with air to be heated. The heated air obtained at the cold outlet of the exchanger being directed (by a line indicated at 29) toward a membrane separator 22, in which it is treated, so as to produce at the residue outlet 23 of the separator a gaseous mixture based on nitrogen comprising a residual concentration of oxygen, this gaseous mixture being directed toward a user station 25 of such a nitrogen base mixture, whilst at the permeate outlet 24 of the separator 22 there is produced a low pressure mixture enriched in oxygen, which can as the case may be sent to the external atmosphere or else toward a user station 26 of such a gaseous mixture enriched in oxygen.

It will be noted that the compressed air supplied by the compressor 20 is, in the illustrated embodiment, before reaching the exchanger 4, preliminarily treated in an air conditioning unit 21, in which are carried out operations such as de-oiling of the air, drying of the air, or again substantial elimination of its particulates.

The compressed air is warmed in the exchanger by heat exchange with a flow of warm oil circulating in the warm passage of the exchanger, countercurrent, from the compressor 20 via the input line 2 (the compressor 20 thus here constitutes both the source of gas 12 to be heated and the source of warm fluid 1 of FIGS. 1 and 2).

If this figure illustrates a countercurrent arrangement of flow in the exchanger, a circulation of the two flows (warm fluid/gas to be heated) co-current could also be envisaged.

The cooled oil obtained at the outlet of the warm passage 8 of the exchanger is then directed, via an outlet line 5, toward the air compressor 20 in which it returns to the normal circuit for cooling the compressor.

An installation as described with respect to FIG. 3 has been used for practice of an embodiment of this invention.

This example permitted the production, at the residue outlet of the separator 22, of a flow of 350 $Nm^3/h$ of nitrogen of 98% purity, from air heated to a temperature of the order of 41° C.

The operating conditions and the performances obtained are described hereinafter:

- use of a KAESER ESB 250 compressor with a lubricated screw;
- flow rate of oil D0: about 24 $m^3/h$;
- flow rate of air to be heated: about 830 $Nm^3/h$;
- flow rate of oil to the exchanger: about 3% of the flow D0;
- pressure drop means "7": a calibrated restriction;
- pressure drop introduced into the branch line: of the order of 500 mbar;
- regulatory valve "6": an all or nothing electrovalve;
- range of temperatures at the inlets/outlets of the exchanger:
- temperature of the inlet air of the cold passage: $\cong 19°$ C.,
- temperature of the outlet air from the cold passage: $\cong 41°$ C.,
- temperature of the oil at the inlet of the warm passage: $\cong 66°$ C.,
- temperature of the oil at the outlet of the warm passage: $\cong 46°$ C.

The whole of the measurements effected permitted detecting a spacing between the temperature of the warmed air obtained at the outlet of the cold passage and the desired reference point being always on this side of 0.1° C., reaching in fact the limit of resolution of the apparatus used, and suiting perfectly the use of a membrane separation located downstream.

This example of embodiment clearly shows the fact that it is possible according to the invention to provide in an economical way the warming of a gas, by recovery of the heat from a source of warm fluid, thereby avoiding the troublesome use of electric heating, whilst obtaining excellent performance of regulation of the warmed gas temperature without significantly disturbing the operation of the source of warm fluid and under the necessary safety conditions.

As indicated above, the warm fluid used here being oil, the flow regulation member selected being an electrovalve, the fact that this electrovalve operates in the presence of oil considerably improves its reliability (in the present invention, the valve opening and closing of the order of once every 10 seconds).

Although the present invention has been described in connection with particular embodiments, it is not thereby limited but is on the contrary adapted to modifications and variations which will become apparent to one skilled in the art. Thus, although the invention has been quite particularly shown with the aid of the case in which the warm fluid is oil from a compressor, it finds application in many other cases of warm fluid, such as for example warm water.

Similarly, if the use of reheating of gas before membrane separation has been particularly described and exemplified, the process according to the invention is applicable to many other fields among which can be mentioned the use of the heating of buildings.

What is claimed is:

1. An apparatus for warming a gas, comprising:

a heat exchanger enclosing both a first passage carrying a warming fluid and a second passage adjacent to said first passage, said second passage carrying a gas being warmed by the warming fluid;

a source of the warming fluid connected to an inlet of said first passage through an inlet line and to an outlet from said first passage through an outlet line;

a branch line connected to said inlet line at a first connection and connected to said outlet line at a second connection, said branch line bypassing said first passage, said branch line comprising means for creating a pressure drop between said first connection and said second connection, so as to provide a substantially greater flow of the warming fluid through said branch line than through said first passage;

means for adjusting a flow rate through said outlet line, said means for adjusting being located one of between said inlet to said first passage and said first connection and between said outlet from said first passage and said second connection; and a membrane gas separator connected to an outlet from said second passage for receiving the warm gas therefrom.

2. The apparatus of claim 1, wherein the warming fluid is one of water and oil.

3. The apparatus of claim 1, wherein said means for creating a pressure drop is arranged and constructed to provide a flow of warming fluid through said branch line that is at least about twenty times greater than a flow of warming fluid through said first passage.

4. The apparatus of claim 3, wherein said means for creating a pressure drop comprises one of a diameter of said branch line less than that of said inlet line, an elbow at a connection of said inlet line to said branch line, and a reducing valve.

5. The apparatus of claim 1, wherein said second connection comprises a venturi connection with a linear through-line connected to said branch line creating a venturi effect with the higher flow rate of the warming fluid from said branch line, and a joining line connected to said outlet line and to a side of said linear through-line where the venturi effect is felt.

6. The apparatus of claim 1, wherein said means for adjusting a flow rate comprises one of a thermostatic regulatory valve, and all-or-nothing electrovalve with a constant frequency of opening and a variable duration of opening based on a temperature of the warmed gas at an outlet from said second passage, and a progressively opening valve.

7. A method of warming a gas, comprising the steps of:

directing a warming fluid from a source of the warming fluid through an inlet line to a first passage of a heat exchanger that encloses both the first passage and a second passage adjacent to the first passage, the warming fluid exiting the first passage through an outlet line that is in fluid communication with the source of the warming fluid;

directing a gas to be warmed by the warming fluid through the second passage;

directing a portion of the warming fluid through a branch line connected to the inlet line at a first connection, merging the portion of the warming fluid in the branch line with the outlet line from the first passage at a second connection, the branch line bypassing the first passage;

creating a pressure drop between said first connection and said second connection, so as to provide a substantially greater flow of the warming fluid through the branch line than through the first passage;

adjusting a flow rate through the outlet line by adjusting a valve located one of between the inlet to the first passage and the first connection and between the outlet from the first passage and the second connection; and providing the warmed gas from an outlet from the second passage to a membrane gas separator.

8. The method of claim 7, wherein the warming fluid is one of water and oil.

9. The method of claim 7, wherein the step of decreasing a pressure in the branch line provides a flow of warming fluid through the branch line that is at least about twenty times greater than a flow of warming fluid through the first passage.

* * * * *